Patented Jan. 4, 1949

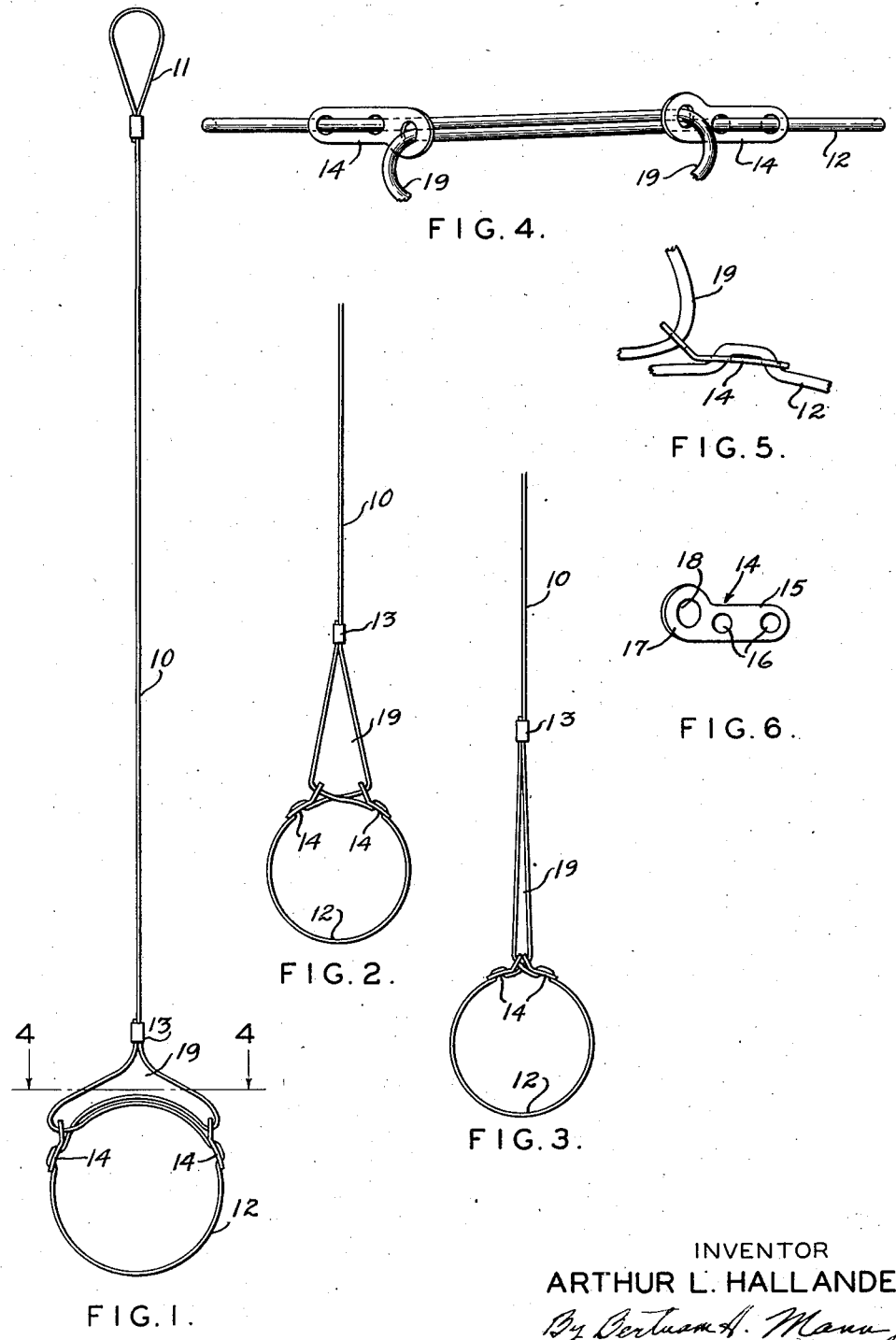

2,458,489

UNITED STATES PATENT OFFICE 2,458,489

LEASH FOR ANIMALS

Arthur L. Hallander, University City, Mo., assignor of one-half to Charles L. Martin, St. Louis, Mo.

Application March 5, 1947, Serial No. 732,465

7 Claims. (Cl. 119—109)

This invention relates to lead cords or leashes for animals, particularly, domestic animals such as dogs and cats.

An object of the invention is to provide a leash which may be easily applied to and removed from the neck of an animal.

Another object is to provide a leash which may be adjusted in accordance with the size of the animal's neck.

Another object to to provide such a leash which consists of a continuous flexible thong or cord which includes both the lead line and the neck encircling collar.

Another object is to provide such a leash which may be adjusted to loosely or tightly fit the animal's neck and which, in the latter case, may be drawn tight as a restraining influence on the application of tension to the lead cord.

These objects and other more detailed objects hereafter appearing are attained by the device illustrated in the accompanying drawing in which Fig. 1 is a view of the leash with the collar portion relaxed for application over the head of a dog or other animal.

Fig. 2 shows the collar portion of the leash somewhat tightened from the position in Fig. 1.

Fig. 3 shows the collar portion of the leash fully tightened by the application of tension to the lead cord.

Fig. 4 is an enlarged top view and section taken substantially on line 4—4 of Fig. 1.

Fig. 5 is an enlarged detail showing one of the apertured securing elements in side view.

Fig. 6 is a plan view of the securing element.

The device is formed substantially of a one-piece flexible thong or cord 10, conveniently of leather, having a hand-grip loop 11 at one end and having its other end looped with its lower or outer portion 12 reversed to form a figure 8, as best seen in Fig. 2. This end of the cord is secured to an intermediate portion thereof to form the loop by a suitable clip or wrapping 13.

An apertured, buckle-like securing clip element 14 has a body portion 15, a pair of adjacent apertures 16 and an offset extension 17 with an aperture 18. One of the elements 14 is applied to each side of bottom or outer lobe 12 of the figure-8 loop, the cord being crimped through apertures 16 in the clip and thence continuing to form the opposite branch or side of upper lobe or bifurcation 19 of the figure-8 loop. The adjacent side portion of upper lobe 19 is threaded through aperture 18 in the extension portion of the clip and is slidably received therein. Thus the apertured elements maintain the figure-8 contour at the lower end of the cord while permitting the lower lobe 12 to be decreased in size by application of tension to the cord. Fig. 3 shows the lower lobe reduced to its maximum extent as limited by engagement of the two clips 14.

In the use of the device, lower lobe 12 is slipped over the animal's head and then is drawn together by the application of tension to the cord. The apertured elements 14 may be adjusted to conform with the neck size of the animal, but once adjusted, will remain firmly positioned on the cord. The adjustment may be such as to provide a loose or comfortable fit around the dog's neck or a tight fit as a restraining influence upon the animal. In the latter case, the lower lobe or collar portion 12 will automatically relax to a loose fit when the cord is relaxed. The leash may be removed simply by the application of outward pressure on the upper portion of lower lobe 12 of the figure-8 between apertured clips 14.

The device is of a special use and advantage when exhibiting dogs in shows because of its easy adjustment, ready application to and removal from the animal, and the possibility of its use to provide slight choking of the animal in case it becomes untractable or obstinate.

The invention may be modified in various respects as will occur to those skilled in the art and the exclusive use of all modifications as come within the scope of the appended claims is contemplated.

I claim:

1. A leash for animals comprising a cord having a loop for encircling an animal or part thereof and a bifurcation adjacent said loop, each side of said loop being extended in one of the branches of said bifurcation and having an apertured element slidably receiving the other branch of the bifurcation.

2. A leash for animals comprising a cord having a figure-8 loop at one end and an apertured element on each side of one lobe of said loop slidably receiving the adjacent side of the other lobe thereof.

3. A leash for animals comprising a cord having a figure-8 loop at one end and an apertured element on each side of the outer lobe thereof, each slidably receiving one of the sides of the other lobe.

4. A leash for animals comprising a cord having a figure-8 loop at one end including an outer lobe for encircling a part of an animal, and an apertured element secured to each side of said outer lobe and slidably receiving the adjacent side of the other lobe to permit ready application of the leash to and detachment thereof from an animal.

5. A leash for animals comprising a hand-grip portion, a flexible cord in the form of a figure-8, and clip elements each with an apertured body through which one side of one lobe of said figure-8 is crimped for lodgement therein and a second apertured portion slidably receiving the adjacent side of the other lobe of said figure-8.

6. A leash for animals comprising a flexible cord having a hand-grip at one end and the other end secured to an intermediate portion of the cord to form a loop, a portion of said loop being reversed to form a figure-8, and a pair of apertured elements each adjustably secured to one side of one lobe of said figure-8 and slidably receiving the adjacent side of the other lobe of said figure-8, whereby said outer lobe may be tightened about an animal's neck upon pulling of said cord and may be readily detached from the animal by application of outward pressure on said outer loop between said apertured elements.

7. A leash for animals comprising a flexible cord and collar portions, said cord portion adjacent said collar portion having a bifurcation the branches of which constitute extensions, respectively, of the opposite sides of said collar portion, and clip means on said collar portion slidably receiving the branches of said bifurcation, said clip means being provided with stop elements on said collar side for limiting the adjustment of said collar portion by the application of tension to said cord portion.

ARTHUR L. HALLANDER.

REFERENCES CITED

The following references are of record in the file of this patent:

UNITED STATES PATENTS

| Number | Name | Date |
|---|---|---|
| 1,776,782 | Carr et al. | Sept. 30, 1930 |